United States Patent [19]

Itoh

[11] Patent Number: 5,473,041
[45] Date of Patent: Dec. 5, 1995

[54] POLYIMIDE HAVING ORGANOPOLYSILOXANE SIDE CHAIN

[75] Inventor: Maki Itoh, Hadano, Japan

[73] Assignee: Dow Corning Corporation, Midland, Mich.

[21] Appl. No.: 248,780

[22] Filed: May 25, 1994

[30] Foreign Application Priority Data

| May 25, 1993 | [JP] | Japan | 5-122777 |
| May 25, 1993 | [JP] | Japan | 5-122827 |
| May 25, 1993 | [JP] | Japan | 5-122828 |

[51] Int. Cl.$^6$ ................................ C08G 77/26
[52] U.S. Cl. .................. 528/26; 528/38; 556/422; 556/425
[58] Field of Search .............. 528/38, 26; 856/422, 856/425

[56] References Cited

U.S. PATENT DOCUMENTS

| 3,288,754 | 11/1966 | Green | 556/425 |
| 4,855,078 | 8/1989 | Leslie | 252/582 |
| 4,975,490 | 12/1990 | Okawa et al. | 525/431 |
| 5,260,352 | 11/1993 | Kawakami | 523/107 |

FOREIGN PATENT DOCUMENTS

| 2025289 | 6/1991 | Canada. |
| 452725 | 10/1991 | European Pat. Off.. |
| 185327 | 7/1989 | Japan. |
| 1204931 | 8/1989 | Japan. |

OTHER PUBLICATIONS

Itoh et al. "Rigid–Rod Polymers . . . " J. of Polymer Science: Part A. vol. 32, pp. 1581–1596 1994.
Polymer (Koubunshi), vol. 37, p. 264 (1988). (Japanese).
Polymer (Koubunshi), vol. 39, p. 452 (1990). (Japanese).
Polymer, vol. 30, p. 553 (1989).
Macromolecules, vol. 24, p. 122 (1991).
Polymer Bull., vol. 25, p. 521 (1991).
Makromol. Chem., Rapid Commun., vol. 11, p. 185 (1990).
Angew. Chem. Int. Ed. Engl., vol. 28, p. 253 (1989).
Liquid Crystal Polymers–11, Majnusz et al. p. 1043.
Makromol. Chem., Rapid Commun., vol. 7, p. 407 (1986).
"Rigid–Rod Polyesters with Flexible Side Chains . . . " Harkness et al. 1991.
Macromol. Chem., vol. 190, p. 3295 (1989).
Macromol. Chem., vol. 188, p. 2865 (1987).
Macromol. Chem., vol. 193, p. 1509, (1992).
Macromol. Chem. 191, pp. 2413–2421, (1990).

*Primary Examiner*—John C. Bleutge
*Assistant Examiner*—Margaret W. Glass
*Attorney, Agent, or Firm*—Alexander Weitz

[57] ABSTRACT

There is disclosed an organopolysiloxane having bifunctional biphenyl groups of the formula I

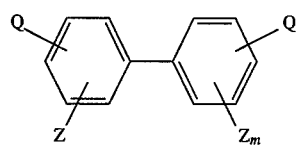

wherein Q is selected from the group consisting of a nitro group, a substituted amino group and an unsubstituted amino group, Z is an organopolysiloxane group represented by the formula II

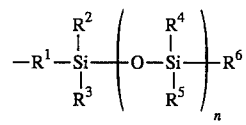

in which $R^1$ is a divalent organic group having at least 2 carbon atoms, $R^2$ through $R^6$ are the same or different monovalent organic groups, n is an integer having a value of at least 1 and m is 0 or 1. The above organopolysiloxane may be reacted with an aromatic tetracarboxylic acid dianhydride and, optionally, with an aromatic diamine to obtain a polyamide acid, which may then be subjected to a thermal imidization step to provide a polyimide having repeating units shown by the formulas VI and VII

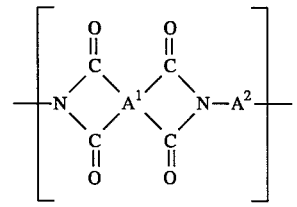

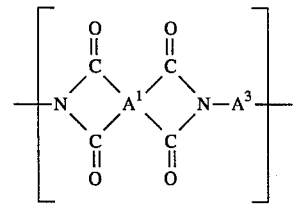

wherein $A^1$ is a tetravalent aromatic group, $A^3$ is a divalent aromatic group and $A^2$ is a divalent organic group which contains a siloxane residue and wherein the molar ratio of repeating unit VI to repeating unit VII in the range 100:0 to 1:99.

12 Claims, No Drawings

POLYIMIDE HAVING ORGANOPOLYSILOXANE SIDE CHAIN

FIELD OF THE INVENTION

The present invention relates to a novel organopolysiloxane having bifunctional biphenyl groups and a method for manufacturing the same. The invention further relates to polyimides containing organopolysiloxane side chain, said polimides being prepared from the novel organopolysiloxane. The present application claims priority from Japanese Application Numbers Hei 5(1993)-122827, Hei 5(1993)-933442 and Hei 4(1993)- 122828, the disclosures of which are hereby incorporated by reference.

BACKGROUND OF THE INVENTION

In recent years, macromolecules which have been under intense research include polymers having polymerizable functional groups (including oligomers), and by means of introducing branches into copolymers, graft copolymers can be obtained wherein the length and number of branches are controlled [for reference, see Yuya Yamashita, *Makuromonoma no kagaku to kogyo Macromonomer Chemistry and Engineering*, I.P.C (1989); Yuji Kawakami, Macromolecules, Vol. 37, p. 264 (1988), and Yoshiki Nakazo, Macromolecules, Vol. 39, p. 452 (1990)).

Most known macromonomers contain vinyl phenyl groups, acryloyl groups or methacryloyl groups as terminal polymerizing groups, and thus are mainly used for chain-extension polymerization. On the one hand, substances containing terminal diol, dicarboxylic acid, dicarboxylic acid ester, diamine, phenol groups, etc., have been documented (refer to Tezuka et al., Polymer, Vol. 30, p. 553 (1989); Tezuka et al., Macromolecules, Vol. 24, p. 122 (1991); Kawakami et al., Polym. Bull., Vol. 25, p. 521 (1991); Ogawa et al., Japanese Kokai Patent Application No. Hei 1-132634; Nagase et al., Makromol. Chem., Rapid. Commun., Vol. 11, p. 185 (1990); Nagase et al., Japanese Kokai Patent Application No. Hei 1-185327 and K. M. Snow et al., CAP-2,025,289, Jun. 23, 1991. However, organopolysiloxanes having bifunctional biphenyl groups as polymerizing groups and manufacturing methods thereof are not yet known.

Aromatic group polymers such as aromatic polyesters, aromatic polyamide (aramide), and aromatic polyimide are becoming increasingly important high performance polymer materials because of their high mechanical strength, heat resistance, solvent resistance, etc. (for reference, see Kobunshi Kakkai [Polymer Society], Koseino Houkouzokukei Kobunshi Zaiyo *High Performance Aromatic Group Polymer Materials*, Maruzen (1990)). However, in comparison to conventional flexible polymers, these rigid chain polymers lack solubility in solvents, and the melting point is high and they are difficult to process. As a result, industrial development and application of the materials was just begun in recent years.

As a method of improving the solubility and reducing the melting point of these aromatic group rigid chain polymers, introduction of flexible polymer side chains has been suggested (for reference, see M. Ballauff, Angew. Chem. Int. Ed. Engl., volume 28, page 253 (1989)). For the purpose described above, aromatic polyesters having alkyl and alkyloxy side chains, or alkyl groups bonded through an ester bond (R. W. Lenz et al., Eur. Polym. J., Volume 19, page 1,043 (1983), M. Ballauff, Makromol. Chem., Rapid Commun., Volume 7, page 407 (1986), B. R. Harkness et al., Macromolecules, Volume 24, page 6,759 (1991), etc.), aromatic polyesters having a polystyrene side chain (T. Heitz et al., Makromoi. Chem., Volume 190, page 3,295 (1989)), aromatic polymide having an alkyloxy side chains (M. Ballauff et al., Makromol. Chem., Volume 188, page 2,865 (1987)), etc., were reported. Also, for the purpose of producing a separation film material, an example where a polysiloxane side chain is introduced to a semirigid aromatic polyimide has been reported (Nagase et al., Makromol. Chem., Volume 193, page 1,509 (1992), etc.). However, an aromatic polyimide having an organopolysiloxane side chain and the unit based on diamine monomer bonded with its side chain comprised of a biphenyl group or a copolymer thereof is not known.

SUMMARY OF THE INVENTION

An objective of the present invention is to offer a novel organopolysiloxane that has bifunctional biphenyl groups and a manufacturing method therefor, which organopolysiloxane is useful as a raw material for synthesizing copolymers with the aforementioned types of side chains.

Another objective of the present invention is to produce a new type of polyimide having the above-mentioned organopolysiloxane side chain and to provide a method for preparing the polyimide.

DETAILED DESCRIPTION OF THE INVENTION

The organopolysiloxane having bifunctional biphenyl of the invention is groups shown in Formula I below:

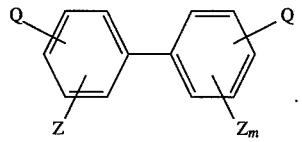

In the formula, Q denotes a nitro group or a substituted or unsubstituted amino group and Z denotes the organopolysiloxane represented by Formula II below:

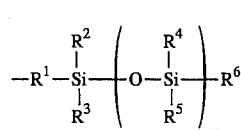

wherein $R^1$ denotes a divalent organic group having at least 2 carbon atoms, $R^2$ through $R^6$ denote the same or different monovalent organic groups, n denotes an integer of 1 or greater, and m is 0 or 1.

In formula I, Q denotes a nitro group or a substituted or unsubstituted amino group, specific examples of which include a nitro group, amino group, monoalkylamino groups, dialkylamino groups, monoarylamino groups, diarylamino groups, acetamide groups and other acylamino groups and trialkylsilylamino groups, with a nitro group, amino group and trialkyisilylamino groups, being preferred. The trialkylsilylamino group is expressed by $—NHSi(R^8)_3$, where $R^8$ is an alkyl group such as methyl or ethyl, a methyl group being preferred.

In Formula II, examples of the divalent organic group expressed by $R^1$ include alkylene groups, oxyalkylene groups, phenylenealkylene groups and phenylene oxyalkylene groups, but oxyalkylene groups are preferred because they are readily obtainable. $R^2$ through $R^6$ are monovalent organic groups, and examples thereof include methyl, ethyl, propyl, octyl, and other alkyl groups, 2-phenylethyl, 2-phenylpropyl, 3,3,3-trifluoropropyl and other substituted alkyl groups, phenyl and other aryl groups, or tolyl and other substituted aryl groups. Of these, with regard to $R^2$–$R^5$ methyl and phenyl groups are preferred, and a methyl group is additionally desirable from an economic standpoint. Methyl, n-butyl, sec-butyl, tert-butyl and phenyl groups are preferred for $R^6$ due to the ease with which the raw materials for the hydroorganopolysiloxane expressed by Formula III, infra, are obtained. n is a positive integer and is preferably 1–5,000, with 3–1,000 being additionally desirable.

In Formula I, the substituents Q each have one bond to the benzene ring, and the polysiloxane chain Z has one bond to each benzene ring, or has only one bond to one of the benzene rings.

Both Z and Q are each bonded to the 2- to 6-position on the benzene ring.

The organopolysiloxane of the present invention can be manufactured by the method described below. Specifically, an organopolysiloxane having dinitrobiphenyl groups expressed by Formula V

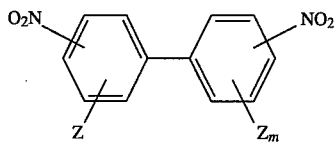   V (in the formula, Z and m are the same as in Formula I), is synthesized by carrying out a hydrosilylation reaction, in the presence of a catalyst, between the terminal hydroorganopolysiloxane described in Formula III below

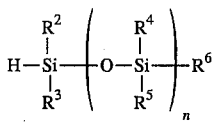   III (in the formula, $R^1$–$R^6$ and n have the same meanings as in Formula II)
and the olefin-functional structure expressed by Formula IV

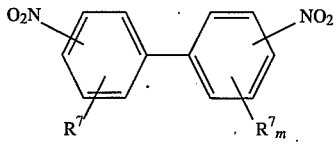   IV wherein $R^7$ denotes an organic group having terminal ethylenically unsaturated groups and m is 0 or 1. A polyorganosiloxane having diaminobiphenyl groups expressed in Formula VI

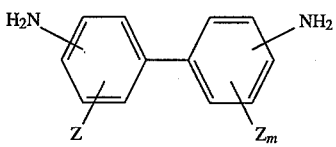   VI (in the formula, Z and m have the same meanings as in Formula I) is obtained by the reduction of the nitro groups of the aforementioned organopolysiloxane having dinitrobiphenyl groups (Formula V). In addition, the organopolysiloxane wherein Q in Formula I is a substituted amino group can be obtained by alkylation, arylation or acetylation of the amino groups of the organopolysiloxane having diaminobiphenyl groups expressed in Formula VI. In addition, an organopolysiloxane having trialkylsilylaminobiphenyl groups expressed in Formula VII

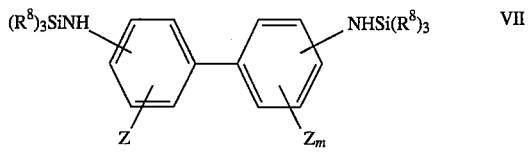   VII (in the formula, Z and m have the same meanings as in Formula I and $R^8$ denotes an alkyl group) is obtained by silylation of the aforementioned amino groups.

With regard to the organopolysiloxane having bifunctional biphenyl groups of the present invention, when there is 1 organic group contained in the dinitrobiphenyl compound expressed by Formula IV, which is a starting material, which organic group has terminal ethylenically unsaturated bonding (i.e., when m=0 in Formula IV), the number of "Z"s (organopolysiloxane) bonded to the resulting compound expressed by Formula I is 1. On the other hand, when there are 2 organic groups contained in the dinitrobiphenyl compound expressed by Formula IV, which organic groups have terminal ethylenically unsaturated bonding, (i.e., when m=1 in Formula IV), the number of "Z"s (organopolysiloxane) bonded to the resulting compound expressed by Formula I is 2.

The terminal hydroorganopolysiloxane expressed by Formula III can be manufactured by a known method.

The nitro group of the dinitrobiphenyl compound expressed by Formula IV has one bond to the benzene ring, and the organic groups R having terminal ethylenically unsaturated bonding each have one bond to each benzene ring, or have only one bond to one benzene ring. The nitro group and $R^7$ may be bonded at the 2- to 6-positions on each benzene ring. Examples of $R^7$ include —CH=CH2, —CH2CH=CH2, —CH2CH2CH=CH2, —CH(CH3)CH=CH2, —(CH2)6CH=CH2, —OCH=CH2, —OCH2CH=CH2, —OCH2CH2CH=CH2, —OCH(CH3)CH=CH2, and —O(CH2)6CH=CH2, but —OCH=CH2, —OCH2CH=CH2, —OCH2CH2CH=CH2, —OCH(CH3)CH=CH2, and —O(CH2)6CH=CH2 are preferred because they are easily obtained. These compounds are generally commercially available, and can be synthesized by the methods described in the application examples presented below.

The hydrosilylation reaction between the terminal hydroorganopolysiloxane expressed by Formula III and the olefin compound expressed by Formula IV is carried out in the presence of a catalyst, with a solvent being preferred. Examples of catalysts are chloro-platinic acid, platinum-divinyltetraethyldisiloxane complex, platinum carbon and other platinum-based catalysts, but the most common substances are $(Ph_3P)_3RhCl$, $(Ph_2PH)_3RhCl$ and $(Ph_3P)_3(CO)RhH$. Co(I), Pd(II), Ru(II) and other transition metal catalysts also may be used. The amount of catalyst is ordinarily $1/10^4$–$1/10^2$ mole for 1 mole of carbon-carbon double bonds. Examples of solvents include benzene, toluene, xylene and other aromatic hydrocarbon solvents, hexane, heptane and other aliphatic hydrocarbon solvents, diethyl ether, tetrahydrofuran and other ether solvents, methanol, ethanol, propanol and other alcohol solvents, acetone, methyl ethyl ketone and other ketone solvents, ethyl acetate, butyl acetate and other ester solvents, chloroform, trichloroethylene, carbon tetrachloride and other halogenated hydrocarbon solvents, and in addition, dimethylformamide, dimethylacetamide and dimethyl sulfoxide. The reaction temperature is 0°–200° C., with 40°–110° C. being preferred, and although the reaction is carried out in a dry inert atmosphere, it is preferable to introduce small amounts of oxygen with the catalyst.

The organopolysiloxane having diaminobiphenyl groups expressed by Formula VI can be synthesized by reducing, to amino groups, the nitro groups of the organopolysiloxane having dinitrobiphenyl groups represented by Formula V. Examples of reduction methods include contact reduction methods using hydrogen, with the catalyst being platinum, Raney nickel, platinum carbon, palladium carbon, rhodium-alumina, platinum carbon sulfide, etc. The reaction should be carried out in a solvent, and examples of solvents include the aforementioned solvents and mixtures thereof. The reaction temperature should be between room temperature and the reflux temperature of the solvent. Reduction methods are not limited to those indicated above.

The organopolysiloxane where Q in Formula I is a substituted amino group is obtained by the alkylation, arylation or acetylation of the amino groups of the organopolysiloxane having diaminobiphenyl groups expressed by Formula VI. Specifically, alkyl halide, aryl halide, acetyl chloride, etc., may be used.

The organopolysiloxane having trialkylsilylaminobiphenyl groups expressed by Formula VII is obtained by silylation of the amino groups of the organopolysiloxane having diaminobiphenyl groups expressed by Formula VI. Examples of silylation agents include trimethylchlorosilane, triethylchlorosilane, triphenylchlorosilane, methyldiethylbromosilane and other trialkylhalosilanes, hexamethyldisilazane, N,N-diethylaminotrimethylsilane, N,O-bis(trimethyl- silyl)carbamate, N-trimethylsilylimidazole and other nitrogen-containing silylation agents. When trialkylhalosilanes are used, a chlorine group is present, and thus it is desirable to neutralize the by-product hydrogen halides. When a nitrogen-containing silylation agent is used, a catalyst such as trimethylchlorosilane and ammonium sulfate may be added. Although the silylation reaction may be carried out in the aforementioned various solvents, excluding alcohol-based solvents, the solvent may be omitted. The reaction temperature is 0°–200° C., with 20°–140° C. being preferred.

The polyimide having a polysiloxane side chain of the present invention has the repeating units shown in the following formulas VIII and IX

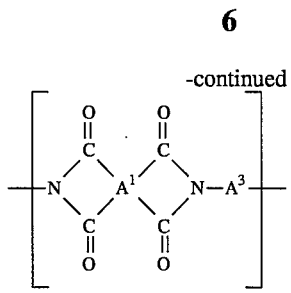

VIII

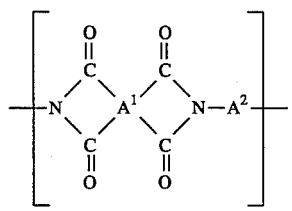

IX wherein $A^1$ represents a tetravalent aromatic group, $A^3$ is a divalent aromatic group and $A^2$ a represents divalent organic group shown in the following formula X in which Z and m have their previously defined meanings.

For the purposes of the present invention, the molar ratio of the repeating unit shown in formula VIII to the repeating unit shown in formula IX is in the range of 100/0 to 1/99.

In the formulas VIII and IX, the tetravalent aromatic group $A^1$ may be selected from the following structures, inter alia

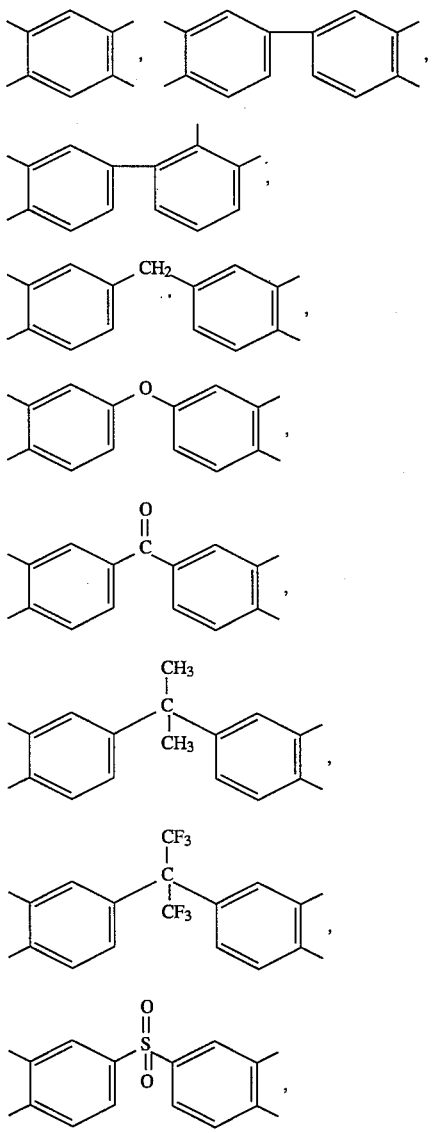

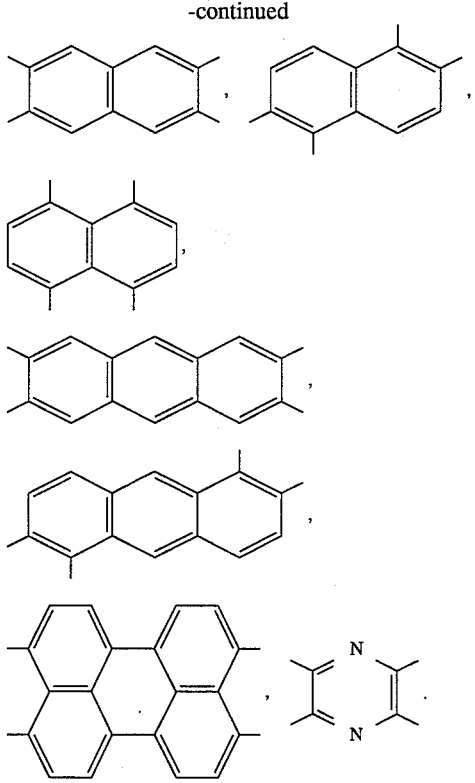

$A^3$ in formula IX is a divalent aromatic group and is exemplified by such structures as

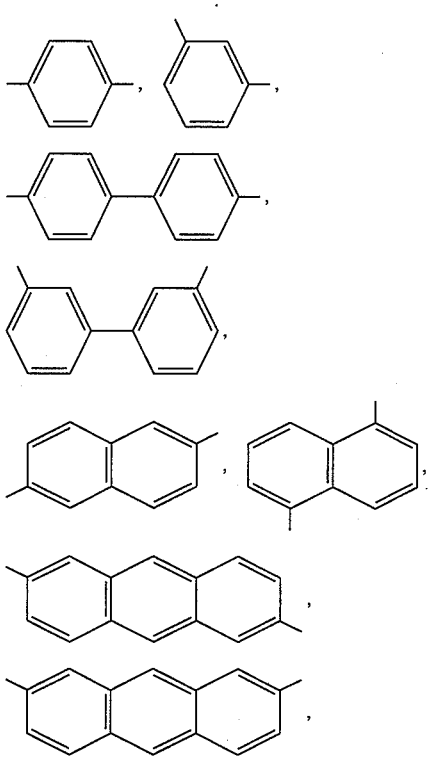

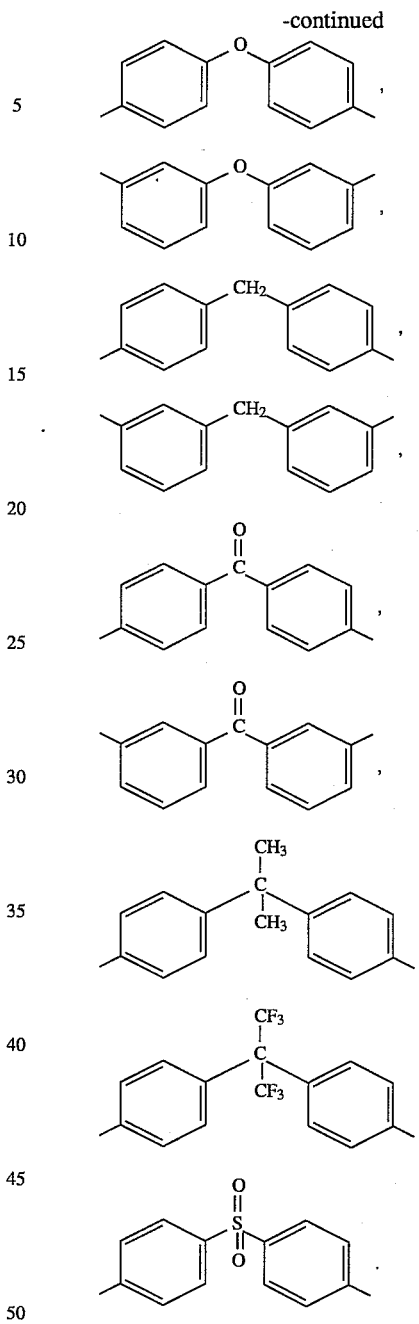

The position where the unit shown in the formula X is bonded with the adjoining unit, and the bonding position of the polysiloxane chain Z may be any position selected from 2- to 6-position of each benzene ring, and each polysiloxane chain Z is either bonded to each corresponding benzene ring or bonded with one benzene ring on one side.

In one embodiment, the polyimide having the organopolysiloxane side chain of the present invention can be produced by the following method. A reaction of equimolar tetracarboxylic acid dianhydride shown in formula XI (in the formula, the definition of $A^1$ is the same as for formula VIII) and an organopolysiloxane having a diaminobiphenyl group shown in formula VI is performed,

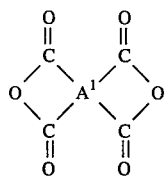

or the diaminobiphenyl group-containing organopolysiloxanes shown by the formula VI and the aromatic diamine compounds shown by the formula XII below,

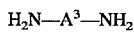

are reacted with tetracarboxylic acid dianhydride, whose molar amount used is equal to the combined molar amount of the former two, to synthesize polyamide acids having organopolysiloxane side chains, comprising the repeating units XIII and XIV at the molar ratio of repeating unit XIII to the repeating unit XIV in the range of 100/0 to 1/99, followed by thermally imidizing the product. Such imidization may be carried out with or without imidizing agents, and if needed, in a solvent.

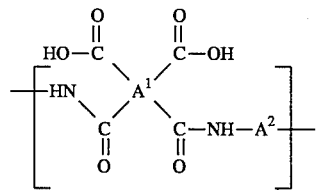

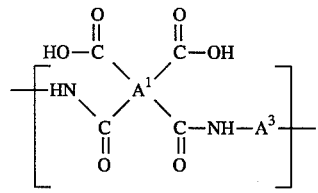

In another enbodiment, a silylation treatment may be performed on the organopolysiloxane having the diaminobiphenyl shown in the formula VI and the aromatic diamine compound shown in the above-mentioned formula XII. Then, a reaction is performed with an aromatic tetracarboxylic acid dianhydride in a solvent to produce a silylated polyamide acid having an organopolysiloxane side chain with the repeating units shown in the following formulas XV and XVI (in the formulas $A^1$ through $A^3$ and $R^8$ have their previously defined meanings), with the molar ratio of the repeating unit shown in the formula XV to the repeating unit shown in the formula XVII in the range of 100/0 to 1/99. This is followed by thermal imidization to obtain a polyimide having organopolysiloxane side chain with the molar ratio of repeating units shown by the formulas VIII and IX at the molar ratio of repeating unit shown by the formula VIII to the repeating unit shown by the formula IX in the range 100/0 to 1/99.

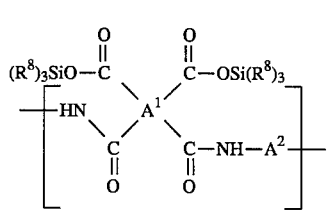

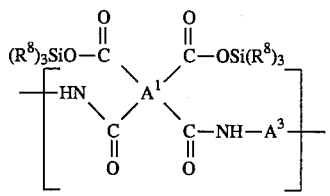

For the aromatic tetracarboxylic acid dianhydride shown in formula XI, pyromellitic acid dianhydride, 3,3',4,4'-biphenyltetracarboxylic acid dianhydride, 2,3,3',4'-biphenyltetracarboxylic acid dianhydride, bis(3,4-dicarboxyphenyl)methane dianhydride, bis(3,4-dicarboxyphenyl)ether dianhydride, 3,3',4,4'-benzophenonetetracarboxylic acid dianhydride, 2,2-bis(3,4-dicarboxyphenyl)propane dianhydride, 1,1,1,3,3,3-hexafluoro-2,2-bis(3,4-dicarboxyphenyl)propane dianhydride, bis(3,4-dicarboxyphenyl)sulfone dianhydride, 2,3,6,7-naphthalenetetracarboxylic acid dianhydride, 1,2,5,6-naphthalenetetracarboxylic acid dianhydride, 1,4,5,8-naphthalenetetracarboxylic acid dianhydride, 2,3,6,7-anthracenetetracarboxylic acid dianhydride, 1,2,5,6-anthracenetetracarboxylic acid dianhydride, 3,4,9,10-perylenetetracarboxylic acid dianhydride, 2,3,5,6-pyrazinetetracarboxylic acid dianhydride, etc., can be mentioned, but it is not limited to these; furthermore, mixture of these can also be used.

For aromatic diamine compound shown in the formula XII, p-phenylenediamine, m-phenylenediamine, 4,4'-diaminobiphenyl, 3,3'-diaminobiphenyl, 2,6-diaminonaphthalene, 1,5-diaminonaphthalene, 2,6-diaminoanthracene, 2,7-diaiminoanthracene, 4,4'-diaminodiphenyl ether, 3,3'-diaminodiphenyl ether, 4,4'-diaminodiphenylmethane, 3,3'-diaminodiphenylmethane, 4,4'-diaminobenzophenone, 3,3'-diaminobenzophenone, 2,2-bis(4-diaminophenyl)propane, 1,1,1,3,3,3-hexafluoro-2,2-bis(4-diaminophenyl)propane, 4,4'-diaminodiphenylsulfone, etc., can be mentioned, but it is not limited to these, and mixtures of these can also be used.

Synthesis of the above-mentioned amide acid is preferably performed in a dry, inert atmosphere. It is possible to perform the reaction without a solvent, but it is desirable for a solvent to be used. For the solvent, the various types of solvents mentioned above and solvent mixtures thereof can be mentioned as examples. The reaction temperature used is preferably −50° C. to 100° C., preferably 0°–50° C.

The imidization treatment under heat of the polyamide acid can be carried out by heating from 100°–400° C., preferably from 150°–350° C. after removing the solvent. In this case, the atmosphere used may be air or an inert gas, or heating can be done under reduced pressure. Also, the imidization of the solution can be carried out in the various types of solvents mentioned above. For example, the reaction may be performed at a reaction temperature in the range of approximately 50°–150° C. with, e.g., acetic anhydride and an amine as the imidization agent, or the reaction may be performed at a temperature of approximately 150°–200° C. without using the imidization agent, but imidization in solution is not limited to these methods. With the imidization method performed in a solution, it is possible to reduce the imidization ratio to less than 100% by the reaction conditions, and the imidization is completed by performing a post heat treatment under the imidization treatment conditions described above.

The silylation of the organopolysiloxane having the diaminobiphenyl group shown in formula VI and the aromatic diamine compound shown in formula XII is performed with a silylation agent. For the silylation agent, trialkylhalosilanes such as trimethylchlorosilane, triethylchlorosilane, triphenylchlorosilane, and methyldiethylbromosilane, and nitrogen-containing silylation agents such as hexamethyldisilazane, N,N-diethylaminotrimethylsilane, N,O-bis(trimethylsilyl)carbamate, and N-trimethylsilylimidazole can be mentioned. When trialkylhalosilane is used, it is desirable to use an alkali in combination to neutralize the hydrogen halide by-products. When a nitrogen-containing silylation agent is used, catalysts such as trimethylchlorosilane and ammonium sulfate can be further included. The silylation reaction can also be performed in the various solvents mentioned above other than alcohol solvents, but the solvent may be omitted. The reaction temperature that can be used is 0°–200° C., but 20°–140° C. is preferable.

The silylated polyamide acid can be synthesized with said silylated diamine as in the case of the synthesis of the above-mentioned polyamide acid. Furthermore, when a heat treatment is performed for the silylated polyamide acid by the method described above, a polyimide can be produced. Needless to say, when a hydrolysis of the silyl ester is carried out, a regular polyamide acid can be produced, and a heat treatment is performed as above, or imidization is performed in a solution as described above.

The polyimides having polysiloxane side chain of the present invention can be designed as needed with desired length and number of side chains, enabling the synthesis of polyimides with reduced melting point and enhanced solubility and also novel characteristics derived by combining the properties of polyimides and polysiloxanes. They may be used as blends with polyimides or siloxanes or as compatibilizers.

EXAMPLES

The present invention is explained in additional detail below using application examples, but the present invention is not limited to these examples.

Reference Example 1

Synthesis of (2-(3-butenyloxy)-4,4'-dinitrobiphenyl

In a beaker, a mixture of 15.0 mL water and 11.0 mL concentrated sulfuric acid was added to 13.0 g 4,4'-dinitro-2-aminobiphenyl, and agitation was carried out for 2 h while heating, whereupon 26.5 g crushed ice were added. An aqueous solution of 3.51 g sodium sulfite was then added dropwise while on an ice bath, and mixing was carried out for 10 min, whereupon the mixture was allowed to stand for a few minutes. A solution produced by adding 33.4 mL concentrated sulfuric acid to 25 mL water was then boiled, and into this was slowly dropped the reaction mixture indicated above. After continuing boiling for 5 min, the solution was poured into a beaker on an ice bath. The product was then suction-filtered, and the filtrate cake was purified using column chromatography to obtain 10.9 g 4,4'-dinitro-2-hydroxybiphenyl (yield 83.9%) in the form of a yellow-brown powder. The boiling point of the product was 220°–222° C.

Next, 10.4 g of the resulting 4,4'-dinitro-2-hydroxybiphenyl were dissolved in 95 mL dry acetone, and 5.52 g potassium carbonate and 7.56 g 4-bromo-1-butene were added and the mixture was refluxed for 71 h. The substance was then purified by a common method to obtain 5.20 g of 2-(3-butenyloxy)- 4,4'dinitrobiphenyl (yield 41.4%) in the form of a light yellow powder. The boiling point of the product was 146°–147° C.

Reference Example 2

Synthesis of polysiloxane having 4,4'-dinitrobiphenyl groups 2.52 g of 2-(3-butenyloxy)-4,4'-dinitrobiphenyl synthesized in Reference Example 1 were dissolved in 80 mL dry toluene, and after adding 100 mL of an isopropyl alcohol solution of 3% chloroplatinic acid, a mixture produced by dissolving 7.88 g of the terminal hydropolysiloxane expressed by the formula below

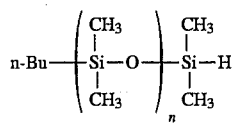

(average value for n=14.4) in 20 mL dry toluene was added dropwise, and agitation was continued for 4 h at 100° C. Purification was then carried out by column chromatography to obtain 8.68 g of a polysiloxane containing 4,4'-dinitrobiphenyl groups in the form of a waxy light-yellow solid (yield 87.1%). Only the terminal (β) adduct was obtained.

1H-NMR spectrum (in CDCl3) d(ppm): 8.27 (d, 2H), 7.90 (d, 1H), 7.83 (s, 1H), 7.68 (d, 2H), 7.46 (d, 1H), 4.08 (t, 2H), 1.78 (m, 2H), 1.42 (m, 2H), 1.29 (m, 4H), 0.86 (t, 3H), 0.53 (m, 4H) , 0.24 to −0.01 (m, 92.4H).

Reference Examples 3–5

By the same method as in Reference Example 2, polysiloxanes having 4,4'-dinitrobiphenyl groups with different degrees of polymerization as shown in Table I were synthesized. There are also examples where platinum-divinyltetramethyldisiloxane complex was used instead of chloroplatinic acid as the catalyst. The same NMR spectra was obtained as in Reference Example 2 but the relative intensity of the O—Si(CH$_3$)$_2$—O groups were different.

TABLE 1

| Reference Example | Dinitrobiphenyl Amount | Type of Catalyst | Hydropolysiloxane | | Dinitrosiloxane Yield |
| --- | --- | --- | --- | --- | --- |
| | | | Average n Value | Weight | |
| 3 | 0.517 g | a | 14.4 | 1.50 g | 1.72 g (90.2%) |

TABLE 1-continued

| | | Hydropolysiloxane | | | |
|---|---|---|---|---|---|
| Reference Example | Dinitrobiphenyl Amount | Type of Catalyst | Average n Value | Weight | Dinitrosiloxane Yield |
| 4 | 1.25 g | b | 26.7 | 7.05 g | 7.21 g (84.4%) |
| 5 | 0.629 g | b | 46.2 | 6.39 g | 6.29 g (98.3%) |

Type of Catalyst:
a - platinum-divinyltetramethyldisiloxane complex
b - chloroplatinic acid Reference Example 6

Synthesis of polysiloxane having 4,4'-diaminobiphenyl groups 270 mg palladium carbon (5% Pd) were suspended in 14 mL of a 1:1 mixed solvent of ethanol and benzene, and a solution produced by dissolving 3.21 g of the polysiloxane having 4,4'-dinitrobiphenyl groups (average n value 14.4) produced in Reference Example 2 in 14 mL of the same mixed solution was then added under a flow of hydrogen. After continuing agitation for 3 h under a flow of hydrogen, the catalyst was separated by filtration, and the solvent was then fractionated off under reduced pressure to obtain a yellow viscous polysiloxane having 4,4'-diaminobiphenyl groups (yield 3.00 g, 97.7%).

1H-NMR spectrum (in CDCl3) d(ppm): 7.29 (d, 2H), 7.07 (d, 1H), 6.66 (d, 2H), 6.30 (d, 1H), 6.29 (s, 1H), 3.87 (t, 2H), 3.61 (d, 4H), 1.74 (m, 2H), 1.44 (m, 2H), 1.30 (m, 4H), 0.86 (t, 3H), 0.54 (m, 4H) 0.05–0.01 (m, 92.4H).

Reference Examples 7, 8

By the same method as in Reference Example 6, polysiloxanes having 4,4'-diaminobiphenyl groups with different degrees of polymerization indicated in Table II were synthesized. The O—Si(CH3)2—O group relative weights were different, but the same NMR spectra were obtained.

TABLE II

| | Dinitropolysiloxane | | | |
|---|---|---|---|---|
| Reference Example | Average n Value | Weight | Catalyst Amount | Diaminosiloxane Yield |
| 7 | 26.7 | 3.50 g | 350 mg | 3.34 g (98.1%) |
| 8 | 46.2 | 2.35 g | 150 mg | 2.25 g (97.2%) |

Reference Example 9

Synthesis of polysiloxane having 4,4'-bis(trimethylsilylamino)biphenyl groups 1.18 g of the polysiloxane having diamino groups produced in Reference Example 7 (average n value, 26.7) were dissolved in 10 mL dry benzene, and 0.158 g dry triethylamine was added. To this was slowly added 0.041 g trimethylchlorosilane, and agitation was carried out for 1 h at room temperature, in an oil bath for 2 h at 60° C., and for 38 h at 80° C. The salts were then filtered out in an argon atmosphere, and the solvent, etc., were removed under reduced pressure to obtain a polysiloxane having 4,4'-bis(trimethylsilylamino)biphenyl groups (yield 1.04 g, 83.1%).

1H-NMR spectrum (in CDCl3) d(ppm): 7.30 (d, 2H), 7.07 (d, 1H), 6.60 (d, 2H), 6.31 (d, 1H), 6.29 (s, 1H), 3.87 (t, 2H), 3.27 (s, 2H), 1.72 (m, 2H), 1.42 (m, 2H), 1.30 (m, 4H), 0.86 (t, 3H), 0.54 (m, 4H) 0.25–0.01 (m, 184.2H).

Application Example 1

Polysiloxane containing 4,4'-diaminobiphenyl group (average value of n of 14.4) synthesized in Reference Example 6 (0.745 g) was dissolved in 4 mL of tetrahydrofuran, 0.114 g of pyromellitic acid dianhydride was added, and stirring was performed at room temperature. The polyamide acid solution produced was coated onto a glass plate, the solvent was then removed at 30° C. under reduced pressure to produce a polyamide film.

The intrinsic viscosity of the polyamide acid having polysiloxane side chain produced was 0.17 dL/g when measured in 25° C. tetrahydrofuran.

IR spectra (cm-1): 2,961 (s), 1,718 (m), 1,669 (m), 1,599 (s), 1,522 (s), 1,497 (m), 1400 (s), 1,256 (vs), 1,076 (sh), 1,059 (sh), 1,007 (vs), 789 (vs) (The intensity of N—H at about 3,300, and C—H of aromatic group at about 3,050 was low, and identification was not possible; s represents high absorption, vs represents a very high absorption, m represents a medium degree of absorption, and sh represents those that appeared as the shoulder of other absorptions.)

Application Examples 2 and 3

Polyamide acids with different degrees of polymerization as shown in Table III were synthesized by the method described in Application Example 1. The IR spectra similar to those of Application Example 1 were obtained, but N—H was observed at about 3,290 cm-1, and the aromatic group C—H was observed at about 3,050 cm-1 in both cases of Application Examples 2 and 3.

TABLE III

| Application Example No. | Average Value of n | Amount of Diamino-polysiloxane | Amount of Pyromellitic Acid Dianhydride | Intrinsic Viscosity |
|---|---|---|---|---|
| 2 | 26.7 | 1.20 g | 0.112 g | 0.28 dL/g |
| 3 | 46.2 | 1.79 g | 0.112 g | 0.30 dL/g |

Application Example 4

A heat treatment was performing for the polyamide acid film produced in Application Example 1 under an argon atmosphere for 20 minutes at 60° C., 20 min at 100° C., and 2 h at 200° C. to produce a polyimide film having a polysiloxane side chain.

IR spectra (cm-1): 2,961 (s), 1,782 (m), 1,726 (vs), 1,605 (s), 1,499 (s), 1,377 (s), 1,258 (vs), 1,177 (m), 1,069 (sh), 1,007 (vs), 785 (vs), 723 (s).

Application Examples 5 and 6

Imidization treatment was performed for the polyamide acids produced in Application Examples 2 and 3 as shown in Table IV by the method described in Application Example 4.

TABLE IV

| Application Example No. | Average Value of n | Absorption of Polyimide by IR Spectra $^{(cm-1)}$ |
|---|---|---|
| 5 | 26.7 | 1784, 1730, 1377, 725 |
| 6 | 46.2 | 1782, 1730, 1377, 725 |

Application Example 7

A reaction was performed for 0.735 g of polysiloxane containing 4,4'-diaminobiphenyl group (average value of n of 14.4) and 0.112 g of pyromellitic acid dianhydride in 4 mL of tetrahydrofuran as in Application Example 1, and a mixture of 0.434 g of triethylamine and 0.440 g of acetic anhydride was added dropwise to the polyamide acid solution produced, and a reaction was performed for 1 h in a 70° C. oil bath. The IR spectra of the polyimide produced as a yellow-colored transparent gel are shown below, and the imidization degree of was 47%.

IR spectra (cm-1): 2,961 (s), 1,779 (m), 1,730 (s), 1,601 (m), 1,520 (w), 1,499 (s), 1,375 (s), 1,260 (vs), 1,094 (sh), 1,022 (vs), 801 (vs), 720 (m) (w represents a weak absorption).

When a heat treatment was performed for the above-mentioned polyimide as in the method described in Application Example 4, the imidization was completed.

Application Example 8

The reaction was performed in a glove bag with the air replaced with argon in all cases. One gram of polysiloxane containing 4,4'-bis(trimethylsilylamino)biphenyl group synthesized in Reference Example 9 was dissolved in 4 mL of tetrahydrofuran in a 10° C. water bath, and a tetrahydrofuran solution of pyromellitic acid dianhydride prepared ahead of time was added dropwise in an amount for the pyromellitic acid dianhydride to be present in an amount of 0.087 g. After 1 h, the water bath was switched to an oil bath, and heat treatment was performed at 35° C. overnight. The polymer solution produced was coated onto a glass plate in the glove bag, the solvent was then removed, and a silylated polyamide acid film was produced.

IR spectra (cm-1): 2,961 (s), 1,703 (m), 1,655 (m), 1,608 (m), 1,534 (m), 1,495 (s), 1,408 (m), 1,256 (vs), 1,209 (s), 1,009 (vs), 823 (s), 788 (vs).

The intrinsic viscosity of the polyamide acid produced upon performing a desilylation treatment of the silylated polyamide acid described above in methanol was 0.24 dL/g.

Application Example 9

An imidization treatment was performed for the silylated polyamide acid film produced in the glove bag in Application.

Example 8 under heat as in the case of the method described in Application Example 4.

IR spectra (cm-1): 2,961 (s), 1,782 (m), 1,730 (vs), 1,602 (s), 1,500 (s), 1,377 (s), 1,257 (vs), 1,177 (m), 1,068 (sh), 1,007 (vs), 785 (vs), 723 (v).

Application Example 10

Polysiloxanes containing 4,4'-diaminobiphenyl group synthesized in Reference Example 6 (0.201 g) (average value of n of 14.4), and 0.496 g of polysiloxanes containing 4,4'-diaminobiphenyl group synthesized in Reference Example 7 (average value of n of 46.2) were dissolved in 5 mL of tetrahydrofuran, 0.062 g of pyromellitic acid dianhydride was added, and stirring was performed at room temperature. The polyamide acid solution produced was coated onto the glass plate, the solvent was removed under reduced pressure, at 30° C., and an amide acid copolymer film having side chains with two different lengths (ratio of the two units 1:1) was produced.

The intrinsic viscosity of the polyamide acid having a polysiloxane side chain was 0.17 dL/g when measured in a 25° C. tetrahydrofuran.

IR spectra (cm-1): 3,291 (w, b), 2,963 (s), 1,713 (m), 1,669 (m), 1,601 (s), 1,526 (s), 1,497 (m), 1,402 (s), 1,258 (vs), 1,080 (sh), 1,011 (vs), 785 (vs) (b indicates absorption of a wide bandwidth.).

Application Example 11

An imidization treatment was performed for the polyamide acid film produced in Application Example 10 under heat as in the case of the method described in Application Example 4. An imide copolymer film having side chains with two different lengths (ratio of the two units 1:1) was produced.

IR spectra (cm-1): 2,963 (s), 1,782 (m), 1,730 (vs), 1,605 (s), 1,499 (s), 1,377 (s), 1,258 (vs), 1,177 (w), 1,073 (sh), 1,007 (vs), 785 (vs), 723 (v).

Application Example 12

Polysiloxanes containing 4,4'-diaminobiphenyl group synthesized in Reference Example 7 (average value of n of 26.7) (0.853 g), and 0.040 g of p-phenylenediamine were dissolved in a 14 mL of a 1:1 solvent mixture comprised of tetrahydrofuran and N,N-dimethylacetamide, 0.159 g of pyromellitic acid dianhydride was added, and stirring was performed at room temperature. The polyamide acid solution produced was coated onto a glass plate, the solvent was removed at 30° C. under reduced pressure, and an amide acid copolymer film with the ratio of the unit containing a biphenyl group with a polysiloxane side chain and the unit containing a p-phenylene group without a side chain of 1:1 was produced.

The intrinsic viscosity of the polyamide acid containing a polysiloxane side chain produced was 0.39 dL/g when measured in a 1:1 solvent mixture of tetrahydrofuran and N,N-dimethylacetamide at 30° C.

IR spectra (cm-1): 3,320 (w, b), 2,963 (s), 1,717 (m), 1,676 (m), 1,601 (s), 1,516 (s), 1,402 (s), 1,258 (vs), 1,074 (sh), 1,009 (vs), 785 (vs).

Application Example 13

An imidization treatment was performed for the polyamide acid film produced in Application Example 12 under heat as in the case of the method described in Application Example 4, and an imide copolymer film having 1:1 ratio of units containing a biphenyl group with a polysiloxane side chains and units containing a p-phenylene group without a side chain was produced.

IR spectra (cm-1): 2,961 (s), 1,780 (m), 1,728 (vs), 1,605 (s), 1,516 (s), 1,499 (m), 1,364 (s), 1,258 (vs), 1,179 (w), 1,078 (sh), 1,007 (vs), 785 (vs), 723 (s).

That which is claimed is:

1. An organopolysiloxane having bifunctional biphenyl groups of the formula I

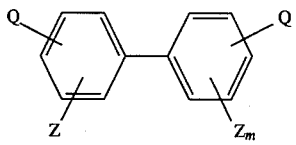

wherein Q is selected from the group consisting of a nitro group and a trialkylsilylamino group, m is 0 or 1, Z is an organopolysiloxane group represented by the formula II

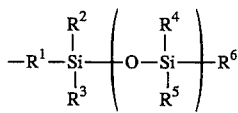

in which $R^1$ is a divalent organic group having at least 2 carbon atoms, $R^2$ through $R^6$ are the same or different monovalent organic groups and n is an integer having a value of at least 1.

2. The organopolysiloxane of claim 1, wherein m in formula I is 0.

3. The organopolysiloxane according to claim 1, wherein the substituent Q is a trialkylsilylamino group.

4. The organopolysiloxane of claim 3, wherein m in formula I is 0.

5. The organopolysiloxane of claim 1, wherein $R^2$ through $R^5$ in formula II are methyl groups.

6. The organopolysiloxane of claim 2, wherein $R^2$ through $R^5$ in formula II are methyl groups.

7. The organopolysiloxane of claim 3, wherein $R^2$ through $R^5$ in formula II are methyl groups.

8. The organopolysiloxane of claim 4, wherein $R^2$ through $R^5$ in formula II are methyl groups.

9. A method for the preparation of a polyimide which contains organopolysiloxane side chains, said method comprising:

(i) silylating (a) an organopolysiloxane having diaminobiphenyl group of the formula I

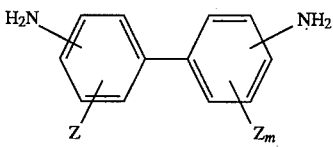

wherein m is 0 or 1 and Z is an organopolysiloxane group represented by the formula II

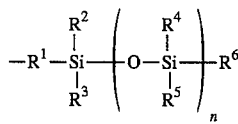

in which $R^1$ is a divalent organic group having at least 2 carbon atoms, $R^2$ through $R^6$ are the same or different monovalent organic groups and n is an integer having a value of at least 1, and, optionally, (b) an aromatic diamine with a compound selected from the group consisting of a trialkylhalosilane and a nitrogen-containing silylation agent; (ii) reacting the silylated compounds from step (i) with (c) an aromatic tetracarboxylic acid dianhydride in a solvent to obtain a silylated polyamide acid having organopolysiloxane side chain with repeating units shown by the formulas VIII and IX

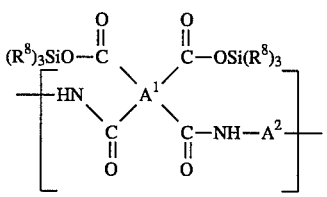

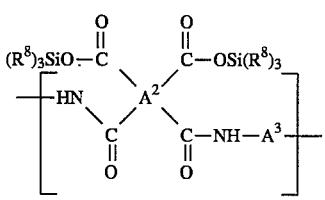

in which $R^8$ is an alkyl group, $A^1$ is a tetravalent aromatic group, $A^3$ is a divalent aromatic group and $A^2$ is a divalent organic group shown by the formula V below,

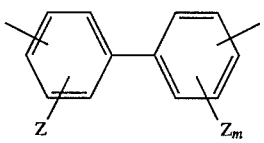

in which Z and m have their previously defined meanings, the molar ratio of repeating unit VIII to repeating unit IX being in the range 100:0 to 1:99, (iii) carrying out a thermal imidization of the product obtained in step (ii).

10. The method according to claim 9, wherein m of formulas I and V is 0.

11. The method according to claim 9, wherein $R^2$ through $R^5$ in formula II are methyl groups.

12. The method according to claim 10, wherein $R^2$ through $R^5$ in formula II are methyl groups.

* * * * *